(12) United States Patent
Kim

(10) Patent No.: US 7,333,117 B2
(45) Date of Patent: Feb. 19, 2008

(54) METHOD OF COMPENSATING COLORS IN IMAGE DISPLAY DEVICE FOR USERS WITH COLOR VISION DEFICIENCY AND DEVICE OF THE SAME

(75) Inventor: Hee Chul Kim, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 506 days.

(21) Appl. No.: 10/982,954

(22) Filed: Nov. 8, 2004

(65) Prior Publication Data

US 2005/0134800 A1 Jun. 23, 2005

(30) Foreign Application Priority Data

Nov. 7, 2003 (KR) .................. 10-2003-0078675

(51) Int. Cl.

| | |
|---|---|
| H04N 1/60 | (2006.01) |
| H04N 5/57 | (2006.01) |
| G09G 5/36 | (2006.01) |
| G09G 5/02 | (2006.01) |
| G06K 1/40 | (2006.01) |
| G06K 9/00 | (2006.01) |
| G03F 3/08 | (2006.01) |
| G06K 9/40 | (2006.01) |
| A61B 3/02 | (2006.01) |
| H04N 15/00 | (2006.01) |
| H04N 5/00 | (2006.01) |
| H04N 9/69 | (2006.01) |
| H04N 9/73 | (2006.01) |
| G06F 1/16 | (2006.01) |

(52) U.S. Cl. .............. 345/600; 345/589; 345/590; 345/549; 345/593; 348/603; 348/616; 358/1.9; 358/3.24; 358/518; 358/520; 382/162; 382/274; 351/200; 351/242

(58) Field of Classification Search ............... 358/1.16, 358/1.18, 1.9, 3.02, 3.24, 518, 3.27, 537; 345/589, 594, 549, 597, 593, 590, 600–601; 382/162–167, 114, 274; 351/200, 203, 211, 351/242, 239; 348/599, 603, 604, 616, 630, 348/673

See application file for complete search history.

(56) References Cited

U.S. PATENT DOCUMENTS

| 4,169,285 A | * | 9/1979 | Walker ................... 345/591 |
| 6,591,008 B1 | | 7/2003 | Surve et al. |
| 6,674,436 B1 | * | 1/2004 | Dresevic et al. ........... 345/472 |
| 2004/0008208 A1 | * | 1/2004 | Dresevic et al. ........... 345/589 |

(Continued)

FOREIGN PATENT DOCUMENTS

EP 0 756 246 A1 1/1997

*Primary Examiner*—Wesner Sajous
(74) *Attorney, Agent, or Firm*—Birch, Stewart, Kolasch & Birch, LLP

(57) ABSTRACT

Disclosed are a method of compensating colors in an image display device for users with color vision deficiency and a device of the same, enabling the users with color vision deficiency to view display images as vividly and naturally as normal users. The method for compensating colors in an image display device includes a step of determining whether a user is partially color blind or normal, and a step of controlling gain values of a plurality of color signals depending upon the user's color perceptivity so as to compensate colors displayed on a screen, if the user is determined to be partially color blind.

15 Claims, 8 Drawing Sheets

U.S. PATENT DOCUMENTS

2004/0041924 A1* 3/2004 White et al. ................. 348/239
2004/0212815 A1* 10/2004 Heeman et al. .............. 358/1.9
2005/0270302 A1* 12/2005 Weast ......................... 345/590
2006/0061586 A1* 3/2006 Brulle-Drews et al. ..... 345/594
2007/0041619 A1* 2/2007 Harrington et al. ......... 382/112
2007/0091113 A1* 4/2007 Jones et al. ................. 345/592

* cited by examiner

METHOD OF COMPENSATING COLORS IN IMAGE DISPLAY DEVICE FOR USERS WITH COLOR VISION DEFICIENCY AND DEVICE OF THE SAME

CROSS-REFERENCE TO RELATED APPLICATIONS

This application claims the benefit of Korean Application No. P2003-078675, filed on Nov. 7, 2003, which is hereby incorporated by reference as if fully set forth herein.

BACKGROUND OF THE INVENTION

1. Field of the Invention

The present invention relates to an image display device, and more particularly, to a method of compensating colors in an image display device for users with color vision deficiency and a device of the same. Although the present invention is suitable for a wide scope of applications, it is particularly suitable for allowing users with deficient color vision, namely, partial color blindness, to view displayed images as vividly and naturally as normal users.

2. Discussion of the Related Art

Recently, technologies of image display devices have shown remarkable improvement, more specifically, in that the displayed colors are represented as vividly and elaborately as natural colors. And, such image display devices are being used extensively in television receivers, personal computers, and mobile phones.

However, users with color vision deficiency (i.e., color blindness or partial color blindness), who do not have the same vision characteristics for colors as normal people, may view the colors displayed from the image display device differently as compared to normal users.

Generally, people having color deficient vision as compared to normal people are referred to as 'color blind' or 'partially color blind'. The broad definition of 'color blindness' is a deficiency in the overall color perceptive ability. More specifically, the term 'color blindness' is used when a person has completely lost the ability to perceive a specific color. On the other hand, 'partial color blindness' refers to a state less severe than 'color blindness', wherein a person has, nevertheless, a deficient color perceptive ability as compared to someone with normal vision. A 'partially color blind individual' eventually refers to someone with partial color blindness. Therefore, in the description of the present invention, the term 'partially color blind individual/user' or 'individual/user with partial color blindness' will be used to describe users of the present invention who have partial color deficient vision, and not those who have completely lost the ability to distinguish certain colors.

When an individual is partially color blind, among the plurality of visual cells in the retina of the individual's eye, the rod cells, which contain information on the brightness of light, and the cone cells, which can distinguish colors and the brightness of light, do not have the same responsivity as individuals with normal vision. Partial color blindness is mostly inherited, and it is known to have no medical cure. However, the partially color blind individuals lack perceptivity for certain colors only and are fully capable of distinguishing the rest of the colors. And so, they generally judge that the colors they perceive through their eyes are natural and normal. Therefore, in certain cases, the partially color blind people are completely unaware of their color deficient vision, which leads them to the misconception that the colors seen through their eyes are in fact natural and normal to everybody else.

Therefore, the present invention has been devised to provide a method and device for compensating colors within the image display device, so as to allow the users having color vision deficiency to perceive the displayed colors as vividly and naturally as seen through the eyes of normal users.

SUMMARY OF THE INVENTION

Accordingly, the present invention is directed to a method of compensating colors in an image display device for users with color vision deficiency and a device of the same that substantially obviate one or more problems due to limitations and disadvantages of the related art.

An object of the present invention is to provide a method of compensating colors in an image display device for users with color vision deficiency and a device of the same that controls the colors of a displayed image, thereby allowing the partially color blind users to view the displayed image through the same color vision as that of normal users.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of compensating colors in an image display device includes a step of determining whether a user is partially color blind or normal, and a step of controlling gain values of a plurality of color signals depending upon the user's color perceptivity so as to compensate colors displayed on a screen, if the user is determined to be partially color blind.

Herein, the step of determining whether the user is partially color blind or normal is carried out by using a test pattern provided on the screen, or by using a user information pre-stored in the image display device, if the user is a pre-registered user.

In the step of controlling gain values of the plurality of color signals, a color of which a user's color perceptivity is not identical to that of a standard perceptivity value is detected, and gain values of color signals corresponding to colors other than the detected color are controlled. At this point, the gain values of the plurality of color signals corresponding to the colors other than the detected color are proportionally controlled depending upon a contrast rate between the user's color perceptivity of the detected color and the standard perceptivity value. And, a contrast gain corresponding to each of the color signals is controlled so as to control the gain values of the color signals.

In another aspect of the present invention, a device of compensating colors in an image display device includes a memory for storing test patterns for testing a user's partial color blindness and a user information, and a controller determining the user's partial color blindness and a user's perceptivity of a plurality of colors, depending upon the test patterns or the user information, and controlling a gain values for a plurality of color signals depending upon the user's color perceptivity.

Herein, the controller determines the user's partial color blindness and the user's color perceptivity depending upon a plurality of answers to the test patterns provided by the user. The controller may also determine the user's partial color blindness and the user's color perceptivity by searching the user's user information, if the user is a registered user.

Furthermore, the controller displays an icon or message for indicating that the colors of the screen are being compensated, as the controller controls the gain values of the plurality of color signals.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, the image display device of the present invention will be referred to as a television (TV) receiver for simplicity. Furthermore, most of the terminologies used in the description of the present invention are generally known terms. However, in some cases, terminologies specifically chosen by the inventor will also be used herein, the terminologies of which will be fully explained in the detailed description of the present invention. Therefore, the details of the present invention should not be understood based on such terminologies only, but by the meaning of the terms lying within the purpose of the present invention.

Also, as described above in the description of the present invention, the term 'partially color blind individual/user' or 'individual/user with partial color blindness' will generally refer to individuals with vision (i.e., a sense of color) different from that of normal individuals. In the present invention, partial color blindness is categorized into a plurality of types, whereby color compensation for each type will be processed accordingly. Hereinafter, the different types of visions with partial color blindness will be described in detail with reference to FIGS. 1 to 4. Moreover, the three types of partial color blindness are specified as the first to third embodiments of the present invention. Nevertheless, it will be understood that when specifying the different types of partial color blindness in more detail, the spirit or scope of the present invention will also apply to any other type of partial color blindness apart from the three types described above.

FIGS. 1 to 4 illustrate graphs showing the difference in vision between a normal individual and a partially color blind individual in accordance with each of the three different types of partial color blindness. In each graph, the x-axis represents the wavelength (wherein the unit is in nanometers (nm)), and the y-axis represents the responsivity (i.e., degree of sensing a specific color) of the partially color blind individual. The graphs represent the relation between three different types of wavelengths and the corresponding type of partial color blindness. The three wavelengths are categorized based on their lengths, the shortest wavelength being $s(\lambda)$, the medium wavelength being $m(\lambda)$, and the longest wavelength being $l(\lambda)$.

Figure 1:
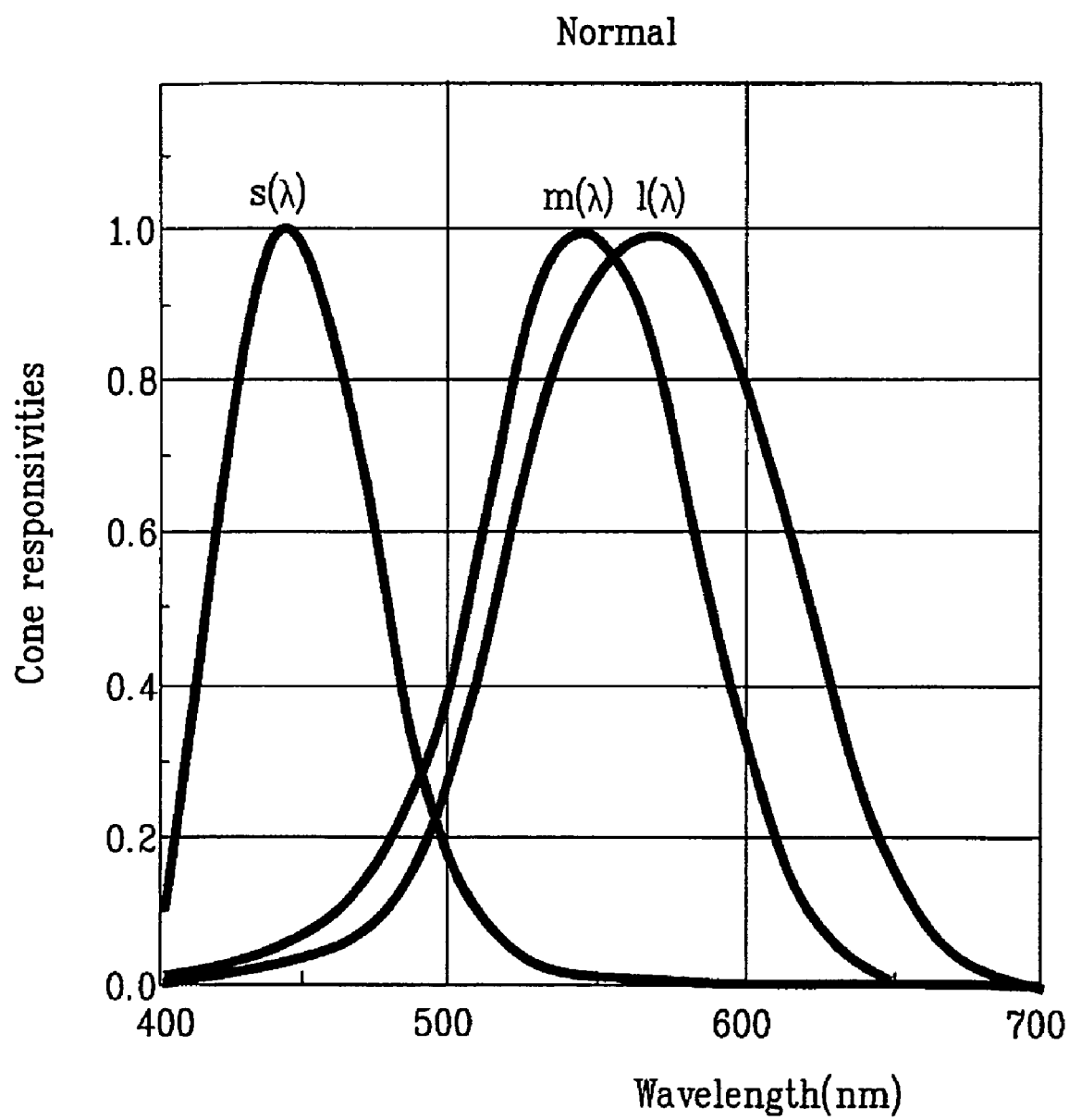
FIG. 1 illustrates a graph showing the vision of a normal individual.

FIG. 1 illustrates a graph showing the vision of a normal individual, wherein the normal individual's responsivity to each of the $s(\lambda)$, $m(\lambda)$, and $l(\lambda)$ wavelengths are equally 1.0.

Figure 2:
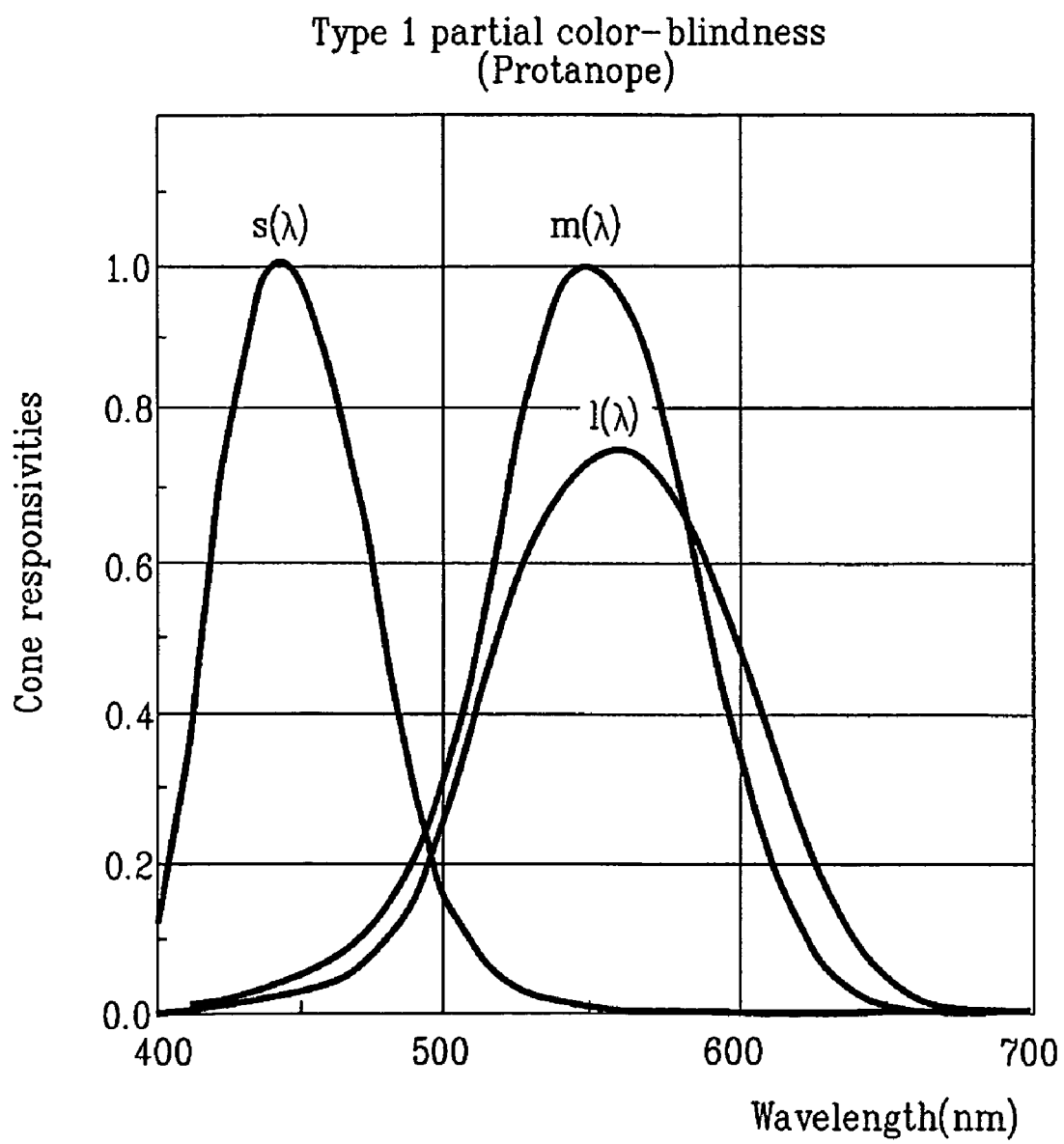
FIG. 2 illustrates a graph showing the vision of an individual with Type 1 partial color blindness.

FIG. 2 illustrates a graph showing the vision of an individual with Type 1 partial color blindness. Herein, the individual with Type 1 partial color blindness shows a responsivity of 1.0 to the $s(\lambda)$ and $m(\lambda)$ wavelengths, which is the same as the normal individual. However, unlike the normal individual, the responsivity to the $l(\lambda)$ wavelength is 0.75. The medical terminology for this type of color blindness is Protanope, however, it will be referred to as the Type 1 partial color blindness for simplicity.

Figure 3:
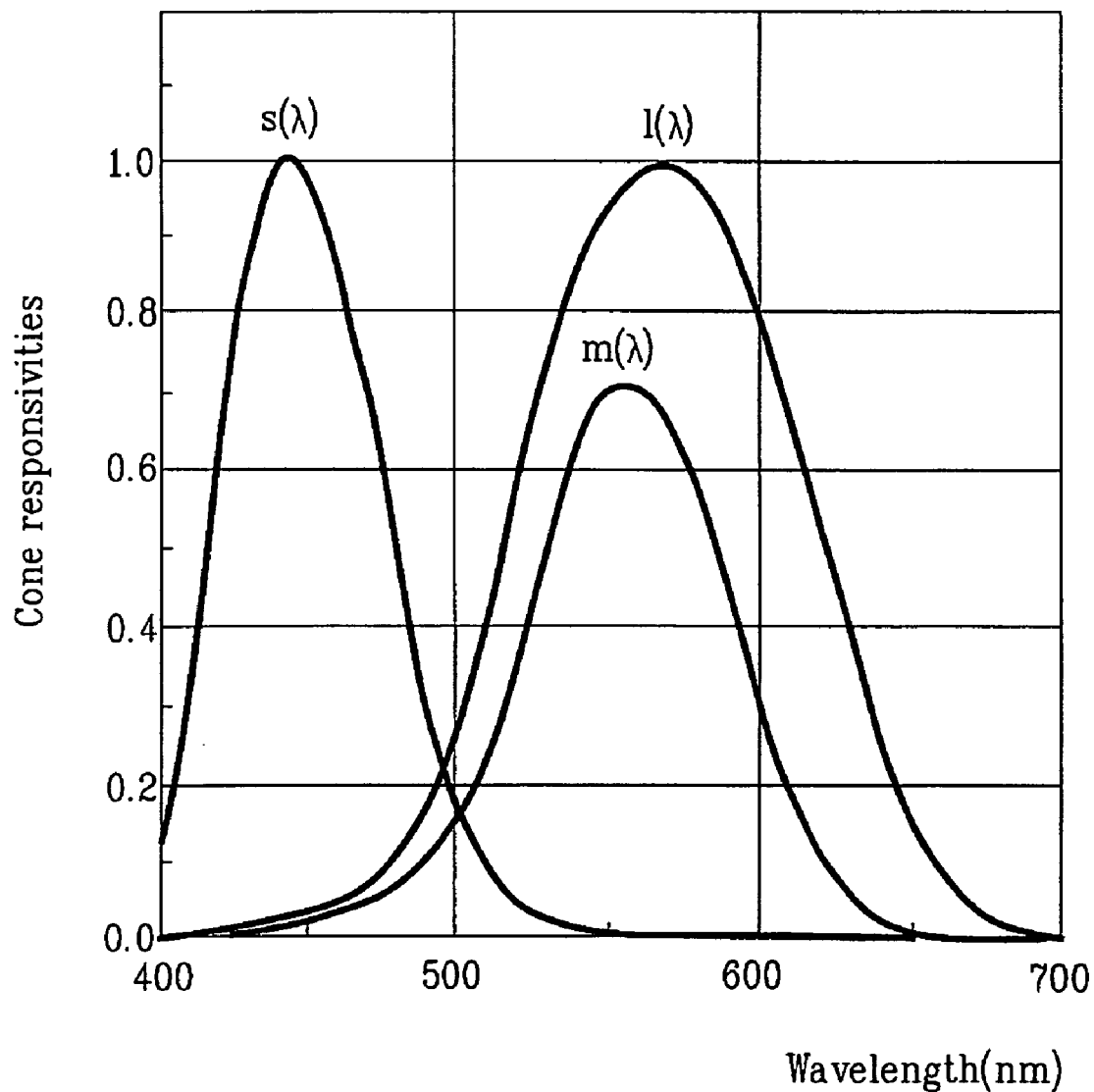
FIG. 3 illustrates a graph showing the vision of an individual with Type 2 partial color blindness.

FIG. 3 illustrates a graph showing the vision of an individual with Type 2 partial color blindness. Herein, the individual with Type 2 partial color blindness shows a responsivity of 1.0 to the $s(\lambda)$ and $l(\lambda)$ wavelengths, which is the same as the normal individual. However, unlike the normal individual, the responsivity to the $m(\lambda)$ wavelength is 0.7. The medical terminology for this type of color blindness is Deuteranope, however, it will be referred to as the Type 2 partial color blindness for simplicity.

Figure 4:
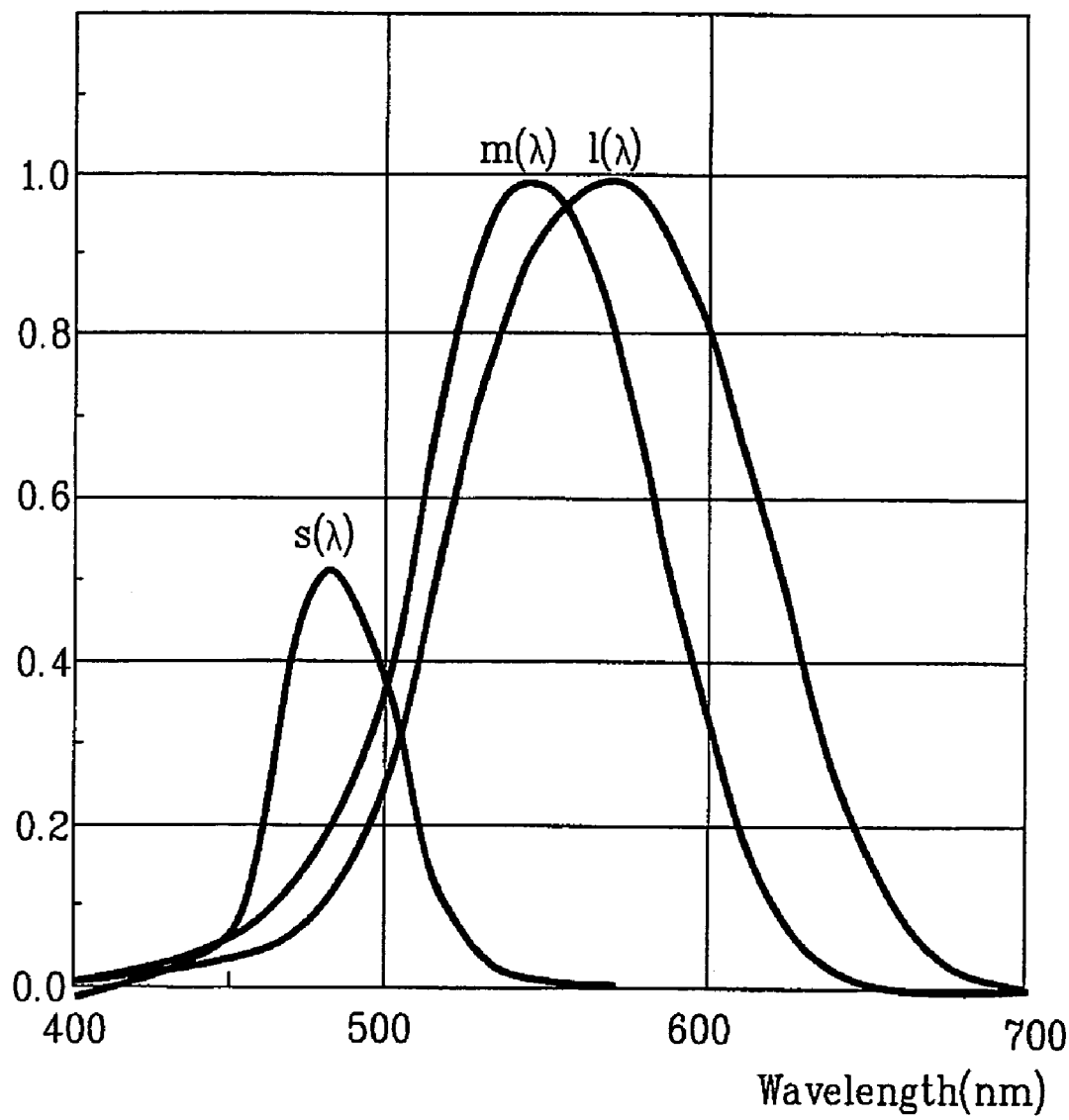
FIG. 4 illustrates a graph showing the vision of an individual with Type 3 partial color blindness.

FIG. 4 illustrates a graph showing the vision of an individual with Type 3 partial color blindness. Herein, the individual with Type 3 partial color blindness shows a responsivity of 1.0 to the $m(\lambda)$ and $l(\lambda)$ wavelengths, which is the same as the normal individual. However, unlike the normal individual, the responsivity to the $s(\lambda)$ wavelength is 0.5. The medical terminology for this type of color blindness is Tritanope, however, it will be referred to as the Type 3 partial color blindness for simplicity.

Referring to FIGS. 1 to 4, it is apparent that the responsivity of the individuals of the Type 1, Type 2, and Type 3 partial color blindness to each of the corresponding wavelength is lower than that of the normal individual. Herein, each of the specific wavelengths respectively corresponds to each of the red (R), green (G), and blue (B) wavelengths, which are the basic colors used for representing and displaying an image.

In other words, the individual with the Type 1 partial color blindness shows deficient vision responsivity for the red (R) wavelength as compared to the normal individual. The individual with the Type 2 partial color blindness shows deficient vision responsivity for the green (G) wavelength. And, finally, the individual with the Type 3 partial color blindness shows deficient vision responsivity for the blue (B) wavelength. Hereinafter, the colors red (R), green (G), and blue (B) will be referred to as R, G, and B, respectively, for simplicity.

Referring to FIGS. 5 to 8, the device and method of compensating colors, so as to allow the users with the different types of partial color blindness to perceive the displayed colors as seen through the eyes of normal users, will now be described in detail.

Figure 5:
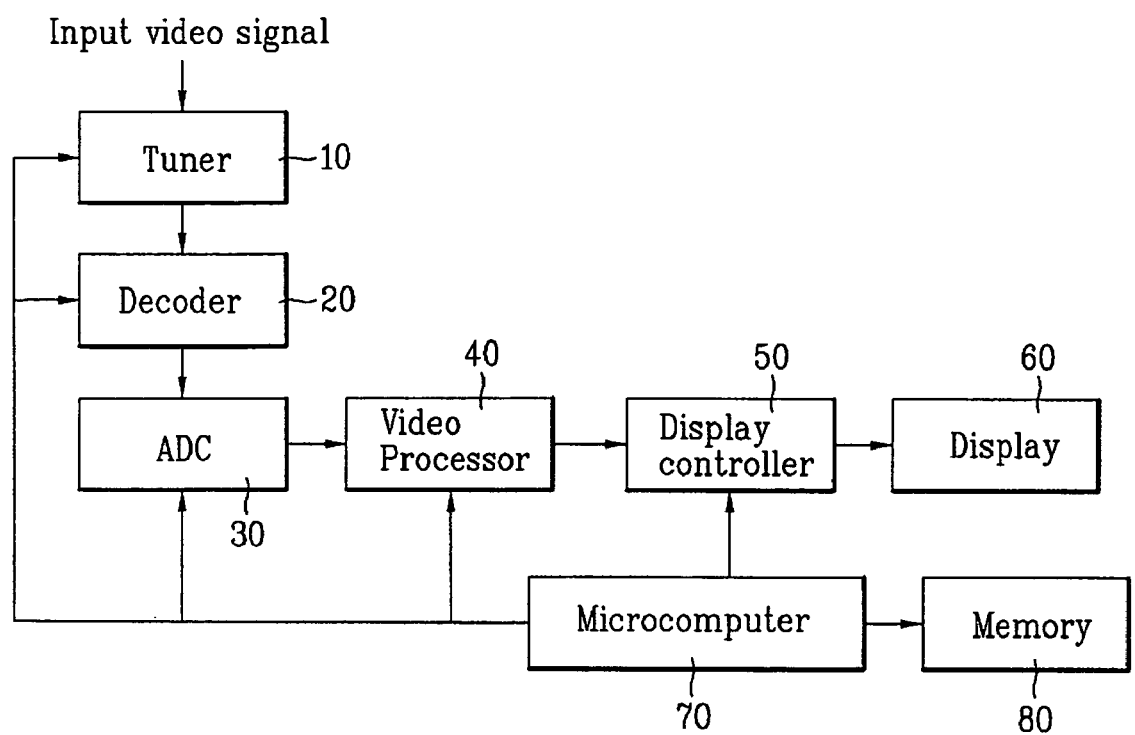
FIG. 5 illustrates a block diagram of a device of compensating colors in the image display device according to the present invention.

FIG. 5 illustrates a block diagram of a device for compensating colors in the image display device according to the present invention. Herein, a digital television (DTV) receiver is given as an example for simplicity, nevertheless, the same description can also be equally applied to personal computers (PC) or mobile phones.

Referring to FIG. 5, a video signal received through a tuner 10 is decoded from a decoder 20. The decoded video signal is then sent to an A/D converter 30 to be converted into a digital signal. In the digital television (DTV) receiver, since the decoded video signal is a digital signal, the A/D converter (ADC) 30 is not necessary.

The video signal outputted from the A/D converter 30 is inputted to a video processor 40, wherein the digitalized video signal is converted into R, G, and B signals. Herein, the digitalized video signal is a luminance/color difference signal including Y, U, and V signals, which are then converted into R, G, and B signals at the video processor 40 in order to be suitable for human vision. A microcomputer 70 generally controls the above-described process. The microcomputer 70 also sends a command to a display controller 50 to compensate R, G, and B signals in accordance with the vision of the partially color blind user. Subsequently, the display controller 50 controls the gain values of the R, G, and B signals in the displayed image depending upon the color compensation command sent from the microcomputer 70. A memory 80 allows the microcomputer 70 to determine whether the user is partially color blind or not by storing a user information of the corresponding user and a test pattern for testing partial color blindness. Therefore, the microcomputer 70 of the present invention determines the vision of the present user based on the data stored in the memory 80. The process will be described in detail with reference to FIGS. 6 and 7.

Figure 6:
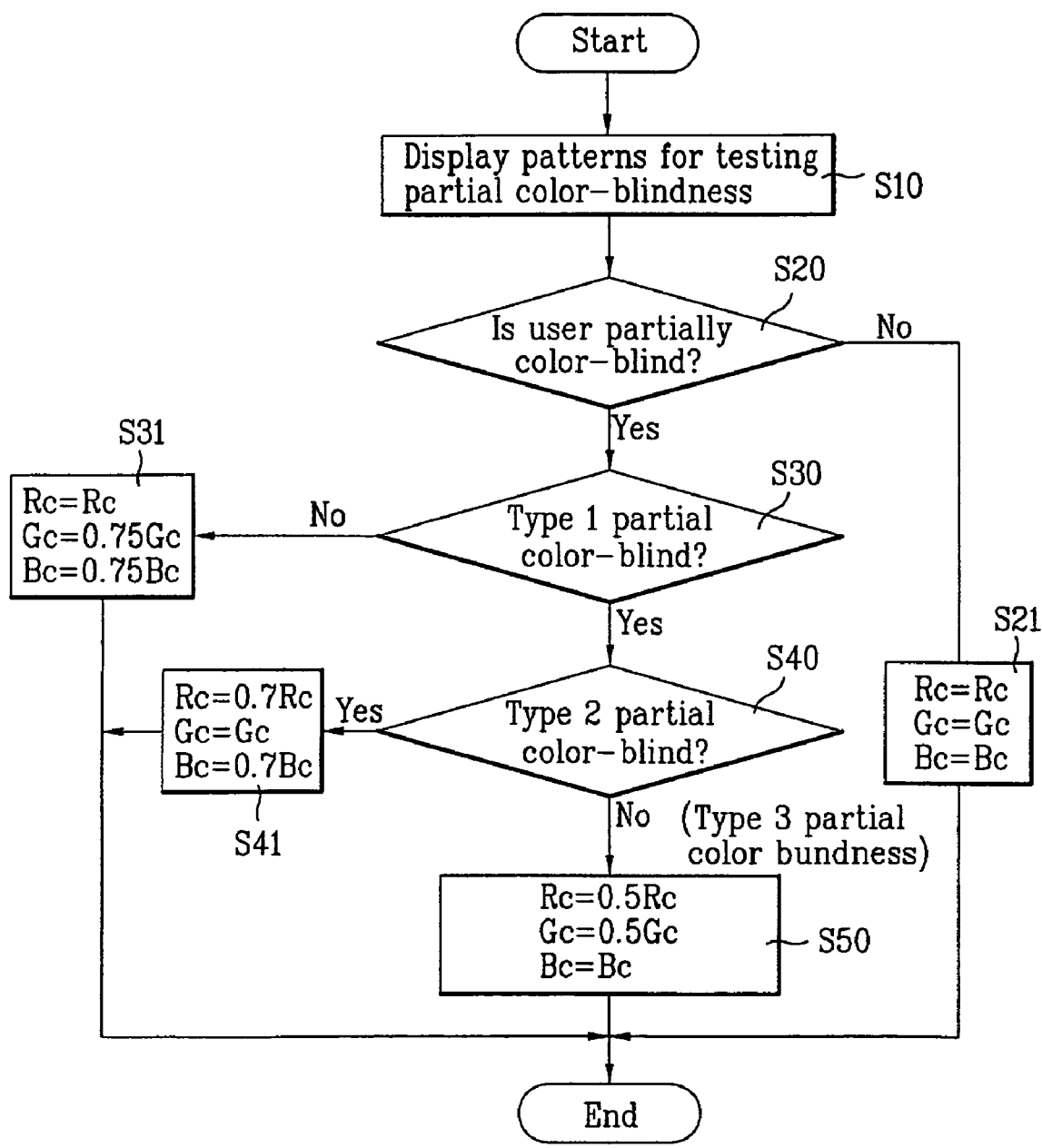
FIG. 6 illustrates a flowchart of a method of compensating colors in the image display device according to a first embodiment of the present invention.

FIG. 6 illustrates a flowchart of a method of compensating colors in the image display device according to a first embodiment of the present invention. Referring to FIG. 6, the user's vision is verified through testing, and the flowchart of the color compensation process depending upon the verified result is illustrated herein.

Figure 8:
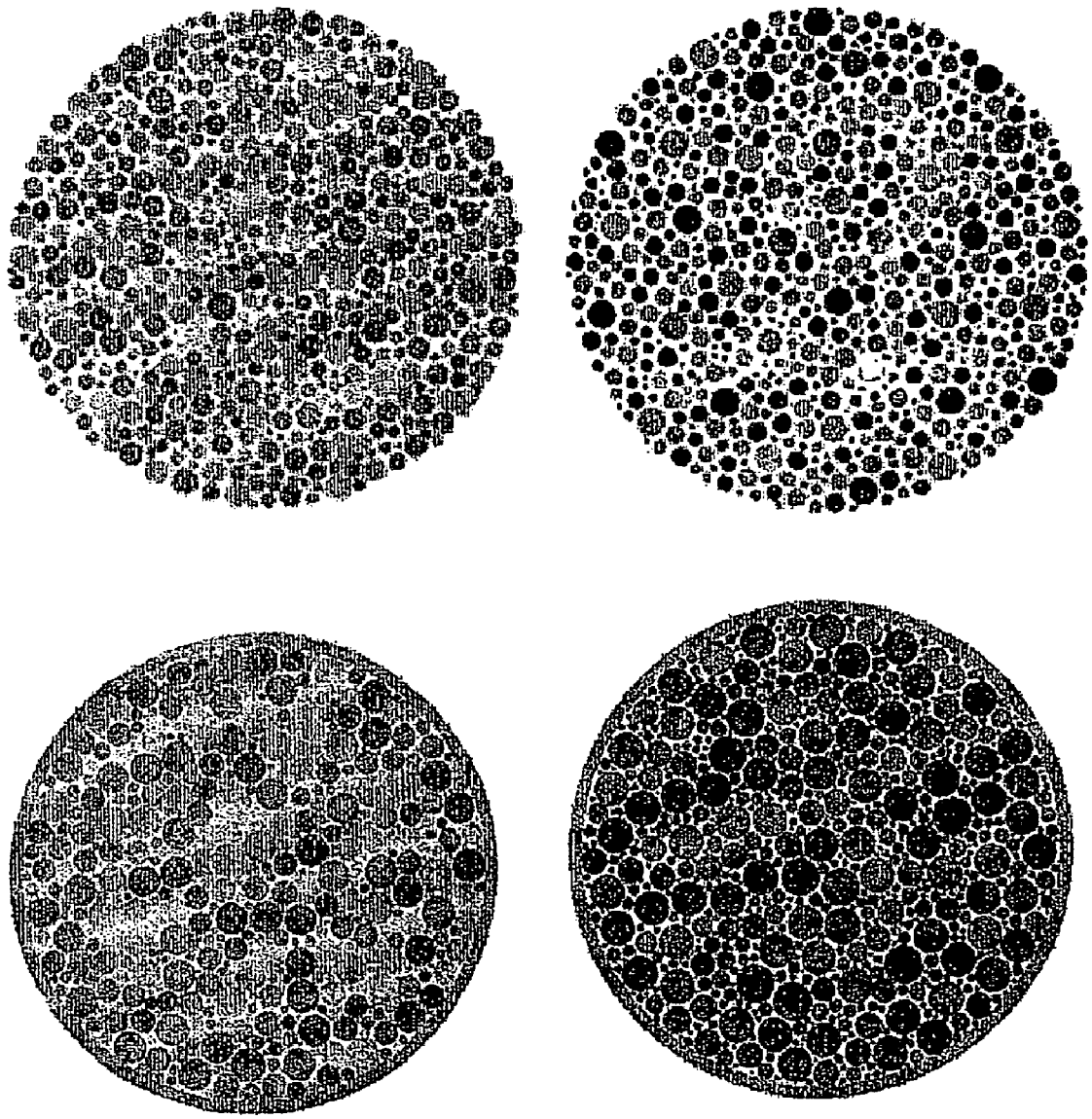
FIG. 8 illustrates a series of test patterns for testing a user's partial color blindness applied in the present invention.

When the user initiates viewing of the television, or when the user desires to have his or her vision tested, the microcomputer 70 displays a series of test patterns for testing partial color blindness (e.g., the test patterns shown in FIG. 8), which is pre-programmed in the memory 80 (S10). When testing for partial color blindness, the general patterns used for testing color blindness may be used. The user views a series of test patterns displayed on the TV screen and uses the dial pad on the remote controller to input and transmit his or her answers. Subsequently, the microcomputer 70 determines whether the user is partially color blind or not, based on the data provided by the user (S20). Also, when the user is determined to be partially color blind, then the type of partial color blindness is also determined accordingly. Examples of the test patterns for testing partial color blindness are shown in FIG. 8. As described above, the general test patterns for testing color blindness are applied herein, whereby the test patterns enable the microcomputer 70 of the present invention to determine whether the user is 'partially color blind' or 'normal'. If designed and created in the future, a specialized test pattern for specifically testing partial color blindness may then be applied herein.

According to the results from Step 20, when a user is determined to have a normal vision, the original gain values for the R, G, and B signals are used (S21). However, when the user is determined to have a color defective vision, then the gain values for the R, G, and B signals should be controlled.

When a tested user is determined to have Type 1 partial color blindness (S30), the gain values for the R, G, and B signals are controlled. However, the perceptivity for the color red (R) color in a defective user with Type 1 partial color blindness is only 0.75 times that of an individual with normal vision. Therefore, when compensating the colors, the microcomputer 70 lowers the gain values for the G and B signals to 0.75 times their original values (S31).

The gain values for the R, G, and B signals are compensated by controlling the contrast gain for each of the R, G, and B signals. The contrast gain is used to represent the gain values for the R, G, and B signals: Rc, Gc, and Bc. When the controlled contrast gain is more than '1', in other words, when the number of signal bits inputted from the display controller 50 is greater than the number of signal bits outputted from the display controller 50, the maximum value for the control gains is normalized to '1'. And, the contrast gains for the R, G, and B signals may vary within this range. The above-described method for controlling the R, G, and B gain values are similarly applied to the remaining two types of partial color blindness.

Moreover, when a tested user is determined to have Type 2 partial color blindness (S40), the gain values for the R, G, and B signals are controlled. However, the perceptivity for the color green (G) color in a defective user with Type 2 partial color blindness is only 0.7 times that of an individual with normal vision. Therefore, when compensating the colors, the microcomputer 70 lowers the gain values for the R and B signals to 0.7 times their original values (S41).

Finally, when a tested user is determined to have Type 3 partial color blindness (S50), the gain values for the R, G, and B signals are controlled. However, the perceptivity for the color blue (B) color in a defective user with Type 3 partial color blindness is only 0.5 times that of an individual with normal vision. Therefore, when compensating the colors, the microcomputer 70 lowers the gain values for the G and B signals to 0.5 times their original values (S50).

Furthermore, when a color compensated image for partially color blind users is being displayed, a display 60 either notifies that color compensation is in process or displays an icon or message indicating the corresponding type of partial color blindness.

In the above-described method of compensating colors according to the present invention, when a user's perceptivity for a specific color in an image of the displayed screen is defective, color compensation is carried out by controlling the gain values of remaining colors to be of the same level as to that of the specific color, thereby enabling the user with color deficient vision to view the displayed image as viewed by a normal user.

Figure 7:
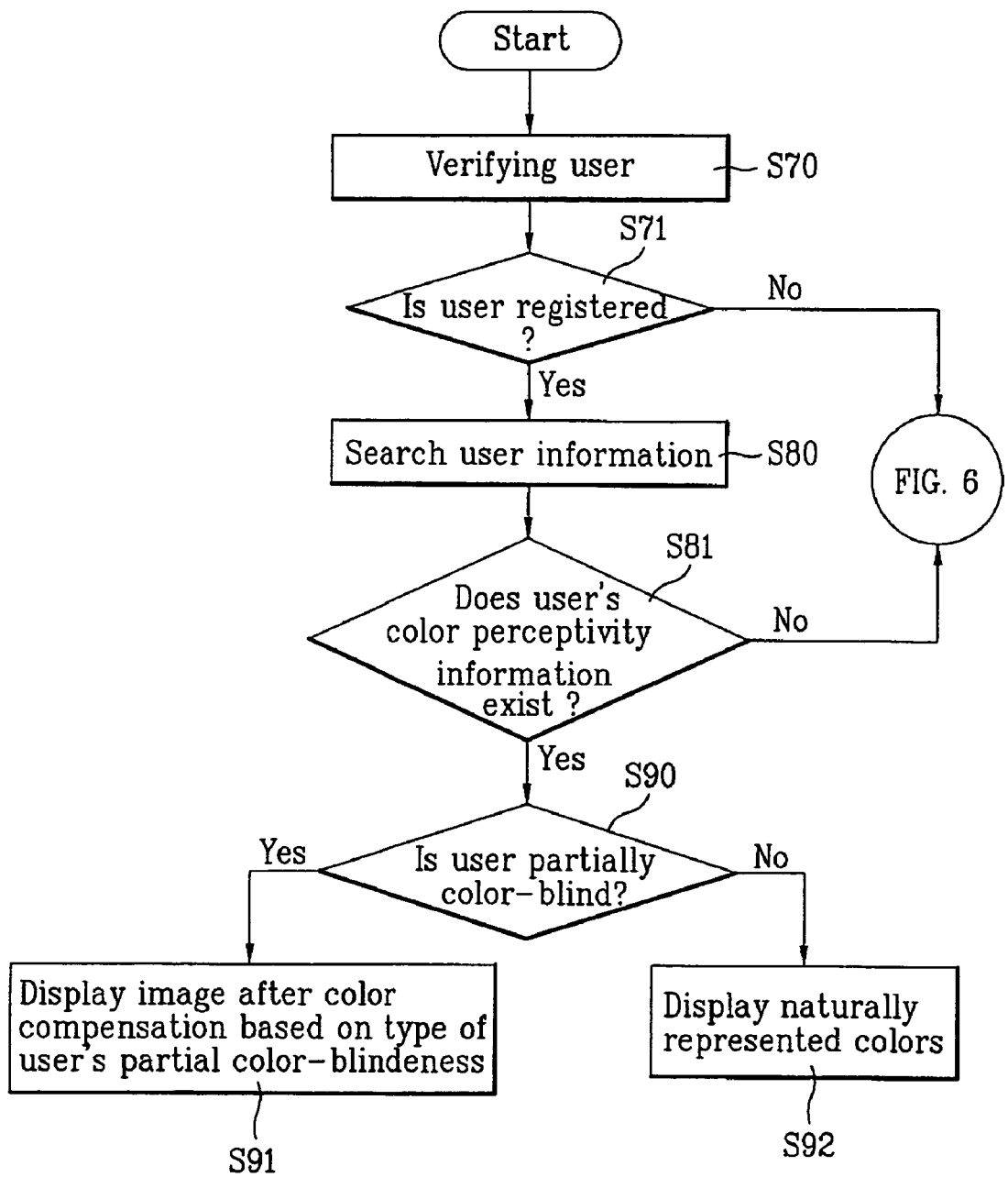
FIG. 7 illustrates a flowchart of a method of compensating colors in the image display device according to a second embodiment of the present invention.

FIG. 7 illustrates a flowchart of a method of compensating colors in the image display device according to a second embodiment of the present invention. Referring to FIG. 7, a user is tested for partial color blindness, just as shown in FIG. 6, and a user information including the corresponding test results are pre-stored in the memory 80 of the device, then, after a simple user identification process, a color compensation suitable for the corresponding user is directly carried out.

When the user initiates viewing of the television, or when the user desires to view the displayed images fitting his or her vision, a user identification process for verifying the current user is carried out (S70). A plurality of conventional user identification methods can be used herein. Generally, a specific user can be verified by simply inputting data, such as user identification (ID) and password. Another identification method can include selecting a corresponding user name or user number among a list of pre-registered users.

When the user identification process (S70) determines that the current user is a pre-registered user (S71), then the microcomputer 70 searches for the corresponding user information of the verified user (S80). Thereafter, based on the user's color vision information included in the searched user information, the microcomputer 70 determines whether the user is normal or partially color blind, and if the user is partially color blind, then, the microcomputer 70 verifies the type of partial color blindness (S90).

According to the results from Step 90, when the user is determined to be partially color blind, the microcomputer 70 carries out a color compensation process corresponding to the verified user (S91). Herein, the same method of FIG. 6 may be used in the method for compensating colors depending upon the user's type of partial color blindness.

More specifically, when the verified user is determined to have Type 1 partial color blindness (S30), the gain values for the R, G, and B signals are controlled. However, the perceptivity for the color red (R) color in a defective user with Type 1 partial color blindness is only 0.75 times that of an individual with normal vision. Therefore, when compensating the colors, the microcomputer 70 lowers the gain values for the G and B signals to 0.75 times their original values (S31).

When the verified user is determined to have Type 2 partial color blindness (S40), the gain values for the R, G, and B signals are controlled. However, the perceptivity for the color green (G) color in a defective user with Type 2 partial color blindness is only 0.7 times that of an individual with normal vision. Therefore, when compensating the colors, the microcomputer 70 lowers the gain values for the R and B signals to 0.7 times their original values (S41).

When the verified user is determined to have Type 3 partial color blindness (S50), the gain values for the R, G, and B signals are controlled. However, the perceptivity for the color blue (B) color in a defective user with Type 3 partial color blindness is only 0.5 times that of an individual with normal vision. Therefore, when compensating the colors, the microcomputer 70 lowers the gain values for the G and B signals to 0.5 times their original values (S50).

Furthermore, when a color compensated image for partially color blind users is being displayed, a display 60 either notifies that color compensation is in process or displays an icon or message indicating the corresponding type of partial color blindness.

In addition, in the step of verifying the current user Step 71, if the verified user is determined to be a non-registered user, or if the information as to whether the current user is partially color blind or not is not included in the user information, then the step of testing the user for partial color blindness (S20), as shown in FIG. 6, is carried out in order to determine the user's color vision.

The method of compensating colors in an image display device for users with color vision deficiency and the device of the same according to the present invention are advantageous in that a wide range of users with deficient color vision can perceive displayed images as vividly and naturally as seen through the eyes of normal individuals.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of compensating colors in an image display device, comprising:
   a step of determining whether a user is partially color blind or normal; and
   a step of controlling gain values of a plurality of color signals depending upon the user's color perceptivity so as to compensate colors displayed on a screen, if the user is determined to be partially color blind,
   wherein the step of controlling gain values of the plurality of color signals is carried out by detecting a color of which a user's color perceptivity is not identical to that of a standard perceptivity value, and controlling gain values of color signals corresponding to colors other than the detected color.

2. The method according to claim 1, wherein the step of determining whether the user is partially color blind or normal is carried out by using a test pattern provided on the screen.

3. The method according to claim 1, wherein the step of determining whether the user is partially color blind or normal is carried out by using a user information pre-stored in the image display device, if the user is a pre-registered user.

4. The method according to claim 1, wherein the gain values of the plurality of color signals corresponding to the colors other than the detected color are proportionally controlled, depending upon a contrast rate between the user's color perceptivity of the detected color and the standard perceptivity value.

5. The method according to claim 1, wherein a contrast gain corresponding to each of the color signals is controlled, so as to control the gain values of the color signals.

6. The method according to claim 1, wherein the step of controlling gain values of the plurality of color signals is carried out by identifying a type of partial color blindness corresponding to the user's color perceptivity for each color, and controlling the gain values of the color signals to a predetermined level corresponding to the identified type of partial color blindness.

7. The method according to claim 1, wherein an icon or message for indicating that the colors of the screen arc being compensated is displayed, along with the controlling of the gain values of the plurality of color signals.

8. A device of compensating colors in an image display device, comprising:
   a memory for storing a plurality of test patterns for testing a user's partial color blindness and a user information; and
   a controller determining the user's partial color blindness and a user's perceptivity of a plurality of colors, depending upon the test patterns or the user information, and controlling a gain values for a plurality of color signals depending upon the user's color perceptivity, wherein the controller detects a color of which a user's color perceptivity is not identical to that of a standard perceptivity value, and controls gain values of color signals corresponding to colors other than the detected color.

9. The device according to claim 8, wherein the controller determines the user's partial color blindness and color perceptivity depending upon a plurality of answers to the test patterns provided by the user.

10. The device according to claim 8, wherein the controller determines the user's partial color blindness and color perceptivity by searching the user's user information, if the user is a registered user.

11. The device according to claim 10, wherein the controller determines whether the user is a registered user based on a user identification (ID).

12. The device according to claim 8, wherein the controller determines the users color perceptivity for red (R), green (G), and blue (B).

13. The device according to claim 8, wherein the controller proportionally controls the gain values of the plurality of color signals corresponding to the colors other than the detected color, depending upon a contrast rate between the user's color perceptivity of the detected color and the standard perceptivity value.

14. The device according to claim 8, wherein the controller searches for a type of partial color blindness corresponding to the user's color perceptivity for each color within the memory, and controls the gain values of the color signals to a predetermined level corresponding to the searched type of partial color blindness.

15. The device according to claim 8, wherein the controller displays an icon or message for indicating that the colors of the screen are being compensated, as the controller controls the gain values of the plurality of color signals.

* * * * *